US007454521B2

(12) United States Patent
Howell et al.

(10) Patent No.: US 7,454,521 B2
(45) Date of Patent: Nov. 18, 2008

(54) BYZANTINE FAULT QUANTIFYING CLOCK SYNCHRONIZATION

(75) Inventors: Jonathan R. Howell, Brier, WA (US); John R. Douceur, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 897 days.

(21) Appl. No.: 10/694,596

(22) Filed: Oct. 23, 2003

(65) Prior Publication Data
US 2005/0089131 A1 Apr. 28, 2005

(51) Int. Cl.
*G06F 15/173* (2006.01)
(52) U.S. Cl. .................. 709/238; 713/500; 713/501; 713/502; 709/230; 709/248
(58) Field of Classification Search .................. 709/238
See application file for complete search history.

(56) References Cited

U.S. PATENT DOCUMENTS 6,097,811 A * 8/2000 Micali ..................... 713/186

OTHER PUBLICATIONS

Mills, David L. "Internet Time Synchronization: the Network Time Protocol", IEEE Trans. Communications 39, 10 (Oct. 1991). pp. 1482-1493.*
Adya, Atul, et al, *FARSITE: Federated, Available, and Reliable Storage for an Incompletely Trusted Environment*; Appears in 5th Symposium on Operating Systems Design and Implementation (OSDI 2002), 'Boston, MA, Dec. 2002, pp. 1-14.
Lamport, Leslie, et al.; *Byzantine Clock Synchronization*; ACM, 1984; pp. 68-74.
Lamport, Leslie, et al.; *The Byzantine Generals Problem*; ACM Transactions on Programming Languages and Systems, vol. 4, No. 3, Jul. 1982, pp. 382-401.
De Prisco, Roberto, et al.; *Revisiting the Paxos Algorithm*; MIT Laboratory for computer Science, Cambridge, MA.
Schneider, Fred B.; *Implementing Fault-Tolerant Services Using the State Machine Approach: A Tutorial*; ACM Computing Surveys, vol. 22, No. 4, Dec. 1990.
Haber, Stuart, et al.; *How to Time-Stamp a Digital Document*; Journal of Cryptology, vol. 3, No. 2, 1991, pp. 99-111.
Lamport, Leslie; *Using Time Instead of Timeout for Fault-Tolerant Distributed Systems*; ACM Transactions on Programming Languages and Systems, vol. 6, No. 2, Apr. 1984, 254-280.

(Continued)

*Primary Examiner*—Yves Dalencourt
*Assistant Examiner*—Michael C Lai
(74) *Attorney, Agent, or Firm*—Wolf, Greenfield & Sacks, P.C.

(57) ABSTRACT

The clocks of remote computing devices are synchronized within a range of certainty through the determination of an upper bound and a lower bound around a reference time. A message from a computing device is propagated up a network tree of devices to a device having a reference time, which encodes the reference time and returns the message down the tree. Each receiving device can determine that the reference time could not have occurred before their transmission of the message, nor could it have occurred after their receipt of the return message. Cryptographic hashes can be used to guard against malicious computing devices. Alternate paths and scheduling of messages can be used to provide a narrower spread between the upper and lower bounds, and clock drift can be accounted for by increasing the spread over time.

19 Claims, 6 Drawing Sheets

OTHER PUBLICATIONS

Mills, David L.; *Internet Time Synchronization: the Network Time Protocol*; IEEE Trans. Communications 39, 10 (Oct. 1991), pp. 1482-1493.

Dwork, Cynthia, et al.; *Consensus in the Presence of Partial Synchrony*; Journal of the Association for Computing Machinery, vol. 35, No. 2, Apr. 1988, pp. 288-323.

Castro, Miguel, et al.; *Practical Byzantine Fault Tolerance*; Proceedings of the Third Symposium on Operating Systems Design and Implementation, New Orleans, Feb. 1999, pp. 1-14.

Castro, Miguel, et al.; *Proactive Recovery in a Byzantine-Fault-Tolerant System*; Laboratory for Computer Science, Massachusetts Institute of Technology.

Merkle, Ralph C., *Protocols for Public Key Cryptosystems*; ELXSi International, Sunnyvale, CA, pp. 122-134.

De Prisco, Roberto, et al.; *Revisiting the PAXOS Algorighm*; Theoretical Computer Science 243 (2000) pp. 35-91.

Howard, John H., et al.; *Scale and Performance in a Distributed File System*; ACM Transactions on Computer Systems, vol. 6, No. 1, Feb. 1988, pp. 51-81.

Lamport, Leslie; *The Part-Time Parliament*; ACM Transactions on Computer Systems 16, 2 (May 1998), pp. 133-169.

Lamport, Leslie; *Time, Clocks, and the Ordering of Events in a Distributed Systems*; Communications of the ACM, vol. 21, No. 7, Jul. 1978, pp. 558-565.

Schneider, Fred B.; *Understanding Protocols for Byzantine Clock Synchronization*; Department of Computer Science, Cornell University; Aug. 1987, pp. 1-35.

\* cited by examiner

BYZANTINE FAULT QUANTIFYING CLOCK SYNCHRONIZATION

FIELD OF THE INVENTION

This invention relates generally to computer applications and distributed systems and, more particularly, relates to a system and method for more efficiently synchronizing clocks in the presence of malicious processes.

BACKGROUND

As personal computing devices become more powerful, containing increased storage space and processing capabilities, the average user consumes an increasingly smaller percentage of those resources in performing everyday tasks. Thus, many of today's personal computing devices are often not used to their full potential because their computing abilities greatly exceed the demands most users place upon them. An increasingly popular method of deriving use and value from the unused resources of powerful modem personal computing devices is a distributed computing system, in which the computing devices act in coordination with one another to perform tasks and maintain data.

A distributed computing system can utilize a number of interconnected computing devices to achieve the performance and storage capabilities of a larger, more-expensive computing device. Thus, while each personal computing device may only have a few gigabytes of usable storage space, a distributed computing system comprising a number of such devices, can aggregate the available storage space on each individual device and present to a user a terabyte or more of useable storage space. Similarly, a distributed computing system can present to a user a large amount of useable processing power by dividing the user's tasks into smaller segments and transmitting the segments to the individual devices for processing in parallel.

In addition to providing a useful mechanism for using excess computing capacity, distributed systems can also be composed of dedicated inexpensive computing devices in order to achieve the performance and storage capabilities of a larger, more-expensive computing device. A further advantage of distributed systems is the ability to continue to operate in the face of physical difficulties that would cripple a single, larger computing device. Such difficulties could include: sustained power outages, inclement weather, flooding, terrorist activity, and the like.

However, by allowing individual users or individual sites to retain control of the devices used in a distributed system, the reliability of each device is greatly decreased. To compensate for the increased risk that any individual computing device may become disconnected from the network, turned off, suffer a system malfunction, or otherwise become unusable to the distributing computing system, redundancy can be used to allow the distributed computing system to remain operational. Thus, the information stored on any one computing device can be redundantly stored on at least one additional similar computing device, allowing the information to remain accessible, even if one or more of the computing devices fail.

Alternatively, a distributed computing system can practice complete redundancy, in which every device within the system performs identical tasks and stores identical information. Such a system can allow the distributed system to continue to perform useful operations even if all but one of the devices should fail. Alternatively, such a system can be used to allow multiple copies of the same information to be distributed throughout a geographic region. For example, a multi-national corporation can establish a world-wide distributed computing system. Such a corporation might use a number of high performance server computing devices, rather than less powerful personal computing devices, because each individual computing device would be required to service many users within that geographic region. The individual high performance devices can each perform identical tasks and store identical data, allowing users who merely seek to access the data to obtain such access from a high performance device located in a convenient location for that user.

However, distributed computing systems can be difficult to maintain. One known difficulty is synchronizing the clocks of the various computing devices that comprise the distributed computing system. If the clocks of the various computing devices are not synchronized, fatal errors could occur. For example, each computing device may be allowed to modify given files only during a given time range. If the clocks of the computing devices are not synchronized, one computing device may start modifying a file before the prior computing device has completed modifying the same file, possibly resulting in file corruption and data inconsistency or even data loss. An additional difficulty arises from the nature of the physical time keeping devices, generally crystal oscillators, found in most computing devices; namely that physical clocks do not keep perfect time, but generally drift with respect to one another. Therefore, it is not enough to only once synchronize the clocks of the computing devices in the distributed computing system. Instead, repeated execution of a clock synchronization procedure is generally required.

One method for synchronizing the clocks of the computing devices in a distributed computing environment is to simply select a device as a reference device, and synchronize the clocks of each of the other devices to the clock of the reference device. The synchronization could be initiated by each device individually, with each device communicating with the reference device to establish the time to which it should synchronize its own clock, or it could be initiated by the reference device itself, with the reference device establishing a communication channel with every other device and exchanging messages which establish a time to which the other device should synchronize its clock. An alternative synchronization method is to propagate the reference time through the network of computing devices comprising the distributed computing environment. One method for propagating a reference time through a network of computing devices so as to synchronize their clocks to the reference time is the Network Time Protocol (NTP) commonly used on the Internet.

Most common synchronization algorithms, such as those described above, are sufficiently robust that the failure of a computing device that is part of the distributed computing environment does not materially affect the synchronization of other computing devices. Instead, such failures only result in a delay that slows down, but does not otherwise affect, the synchronization. However, a malicious process can disrupt the above referenced mechanisms. For example, a process that indicates widely varying times to different computing devices at approximately the same time introduces an error that can be very difficult to react to. Such malicious processes are known in the art as Byzantine failures, and mechanisms to synchronize clocks in the presence of Byzantine failures can be unscalable, and thus unsuitable for large-scale systems.

A number of methods for synchronizing clocks in the presence of Byzantine failures are presented in the paper entitled "Byzantine Clock Synchronization" by Leslie Lamport and P. M. Melliar-Smith, dated 1984, the disclosure of which is hereby incorporated by reference, in its entirety, into the present application. One Byzantine clock synchronization algorithm reads the value of every clock in the distributed computing environment and then synchronizes its own clock to the average of the values, with the exception that if any clock differed from clock to be synchronized by more than a given amount, that clock value was replaced with the value of the clock to be synchronized. Another Byzantine clock synchronization algorithm relies on the property that in any system having a maximum off failures, malicious or otherwise, any group of f+1 messages containing the same value must be true and a group of 2f+1 messages can be used to prove the truthfulness of the messages to a subsequent recipient. Therefore, the clock synchronization algorithm seeks to obtain either 2f+1 messages by having a computing device send the current value of its clock to every other computing device, and then having those other computing devices relay the value to every computing device, or seeks to obtain f+1 signed messages by having a computing device sign the current value of its clock when it is sent to every other computing device and then having those other computing devices sign the signed message and relay it to every computing device.

Unfortunately, even Byzantine-fault-tolerant algorithms, such as those described above, cannot perfectly synchronize the clocks of the computing devices that comprise the distributed computing system. For example, in order to synchronize their clocks, the computing devices will have to read each other's clocks. Reading a clock is a finite operation, which can involve multiple steps, including determining an appropriate location in memory, and reading the value out of that location in memory. Such delays can affect the accuracy of the synchronization. Another source of error can be the time required to transmit synchronization messages across a communications medium, such as a wired or wireless network. Consequently, even the most robust of algorithms cannot perfectly synchronize a set of clocks.

However, for all but the most time-critical applications, clock accuracy within a range can be an acceptable alternative to a perfectly synchronized series of clocks. For example, if one of the computing devices in the distributed computing environment is allowed to edit a particular file until 9:00 pm, and another computing device is allowed to edit that same file starting at 9:00 pm, it is not necessary that the devices exchange editing capabilities at exactly 9:00 pm. Rather, the only requirement for file integrity is that one device finish editing the file before the other device begins editing the file. However, while the clock synchronization algorithms described above seek to synchronize each clock to a particular reference time by minimizing the error, none of the algorithms quantify the error. Consequently, a computing device may believe its clock is synchronized to the reference time, but it does not have strong bounds on accuracy.

Returning to the above example, if the clock of the device editing the file is a few fractions of a second slow, and the clock of the device waiting to edit the file is a few fractions of a second fast, the second device will believe that it is 9:00 pm before the first device does so, resulting in two devices editing the file at the same time, and possibly corrupting the file's data. Since it is generally not important that the devices exchange editing capabilities at exactly the same time, the system would have been better served if each device had added a mere one second buffer, such that the first device ended its editing a second early, and the second device began editing a second late. The one second is not likely to impact the devices' abilities to complete their editing tasks, and yet that same second is sufficient to prevent the devices from editing the same file at the same time, and thereby corrupting it. As can be seen, in many applications it is more important for each computing device to know with certainty a bound around the reference time than it is for the computing device to have its clock set to a scalar reference time without the guarantee of 100% accuracy.

BRIEF SUMMARY OF THE INVENTION

Embodiments of the invention allow for the determination of an upper bound and a lower bound around a reference time, allowing a determination, with certainty, that the reference time is not prior to the lower bound or later than the upper bound.

In an embodiment, a mechanism for propagating a reference time value through a system of networked computing devices is provided. The mechanism contemplates a hierarchical organization of the networked computing devices such that the lowest level devices initiate the first of a series of messages which can propagate to the highest level, obtain a reference time from the highest level, and then propagate back down to the lowest level.

In another embodiment, a mechanism for propagating a reference time value through a system of networked computing devices using encryption to protect against malicious, or Byzantine, processes is provided. The mechanism contemplates a hierarchical organization of the networked computing devices such that the lowest level devices initiate the first of a series of messages using a nonce or similar unique unforgeable value, which can propagate to the highest level though a series of cryptographic hashes, obtain a reference time from the highest level, and then propagate back down to the lowest level.

In a further embodiment, a reference time is determined at the highest level of a hierarchical network structure through the use of a Byzantine fault tolerant algorithm, such that the computing devices of the highest level are members of the Byzantine fault tolerant system that implements the Byzantine fault tolerant algorithm to determine the reference time.

In a further embodiment, computing devices use a determined upper and lower bound for the reference time in a Byzantine fault tolerant algorithm to perform operations as part of a Byzantine fault tolerant system.

In a further embodiment, the clock drift of each individual computing device can be taken into account when determining the upper and lower bounds for the reference time. The clock drift can be accounted for by comparing the first derivative, the second derivative, or higher derivatives of the local and reference clocks or it can be accounted for by linearly extrapolating historical rate information.

In a further embodiment, more efficient paths between the lowest and highest tiers of the tree of networked computing devices can be used for the propagation of messages providing the upper and lower bounds of the reference clock. Each device can use multiple paths for propagating messages up and down the tree, and can discard those paths that yield the largest deviation between the upper and lower bounds. While discarding inefficient paths, each device can continue to try new paths such that the determination of the upper and lower bounds is based on multiple paths, and not merely a single path.

In a further embodiment, the propagation of messages up the tree of networked computing devices can occur on a fixed schedule so as to allow each device along the path to more efficiently time its sending of messages. Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
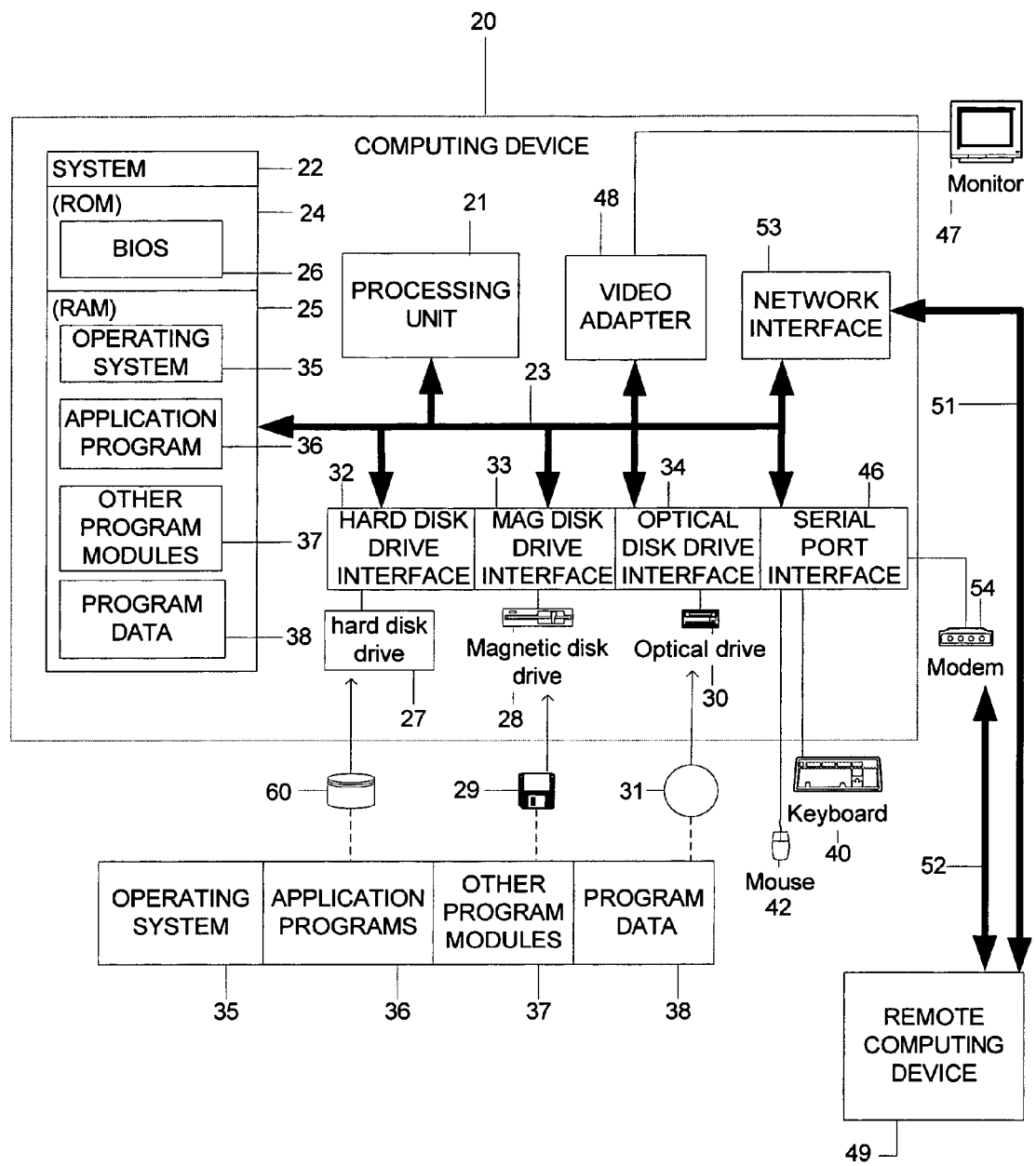
FIG. 1 is a block diagram generally illustrating an exemplary device architecture in which embodiments of the present invention may be implemented.

For many of the functions performed by distributed computing systems, it is not necessary for every device of the distributed computing system to have a precisely synchronized clock. Instead, a precise quantification of the clock synchronization error can often yield a more useful benchmark. For example, a common function performed by distributed computing systems is the maintenance of multiple copies of a database. To avoid corrupting the data stored within the database, generally only a single computing device from the distributed computing system will be allowed to modify data in the database at a given time. One common mechanism for ensuring that only one computing device is allowed to modify data at any given time is to grant leases to individual computing devices, whereby only those computing devices that have a lease have the right to edit the data in the database while their lease is pending.

Often a lease granted to one computing device will expire at the same time as a lease granted to a different computing device begins. Therefore, to avoid multiple computing devices editing the same data at the same time, the clocks of the computing devices can be synchronized, such that each computing device independently maintains the same reference time, and can independently begin or end its editing of the data. However, various errors are present in even the most robust of clock synchronization algorithms. For example, the time taken to physically read the reference clock data can introduce error into a clock synchronization. Similarly, the time taken to transmit the reference clock data across a network connection can also introduce error into a clock synchronization algorithm. Furthermore, even if the clocks of two or more computing devices can be perfectly synchronized, each clock may determine the passage of time slightly differently, resulting in each clock drifting away from the synchronized time. Thus, even accurate clock synchronization algorithms cannot perfectly synchronize the clocks of two or more computing devices.

However, absent any information regarding the clock synchronization error, each computing device will believe that its clock is set to the reference time. Therefore, if a first device was granted a lease ending at 9:00 pm and a second device was granted a lease beginning at 9:00 pm, the first device may continue to edit the database until its clock reads 9:00 pm, while the second device may commence editing the database when its clock reads 9:00 pm. If the clock of the first device is slightly slower than the reference time and the clock of the second device is slightly faster, then both devices may simultaneously be editing the data of the database, resulting in possible data corruption, or other errors. To avoid such a collision, the first device could end its editing of the database a little early, and the second device could begin its editing of the database a little late. The length of a lease is generally established to be longer than the actual time required by the computing device to perform the modification to the data for which it requested the lease. Thus, a computing device does not need to begin modifying the data of the database at the very beginning of the lease, nor does it need to continue modifying the data until the very end of the lease. However, absent any useful information regarding the inaccuracy of each devices' clocks as compared to the reference, it is difficult to determine how much of an offset should be applied to both maintain data integrity by avoiding data editing collisions, and to efficiently perform modifications within the lease time allotted.

If, for example, the first device whose lease expires at 9:00 pm can determine that its clock is within two minutes of the reference time, then it can complete its edits prior to 8:58 pm by its clock, since that is the earliest time, as indicated by the first device, at which the reference time could be 9:00 pm. Similarly, if the second device whose lease begins at 9:00 pm can determine that its clock is within 3 minutes of the reference time, then it can postpone beginning any edits to the data until its clock reads 9:03 pm, since that is the latest time at which the reference time could be 9:00 pm. The greater the level of certainly as to the upper and lower bounds, the less likely it will be for distributed devices to collide with one another while performing scheduled events.

The upper and lower bounds of a reference time can be determined to a significant degree of accuracy by sending a message to a computing device with a reference time, and waiting for a reply, specifying the reference time, from that computing device. If it can be determined that the reply is due to the request, then it can be determined that the reference time specified in the reply cannot have occurred prior to the sending of the request, due to the causal nature of our universe. Similarly, the reference time specified in the reply cannot have occurred after the receipt of the reply for the same reason.

As an example, a first computing device can send a request at 5:55 pm, by its clock, to a reference computing device keeping the reference time. In response, the reference computing device can return a message containing the reference time, which can be received by the first computing device at 6:05 pm, again by its clock. If the received reference time is 9:00 pm, then the first computing device can determine two useful boundaries. Due to the properties of causation, the reference time of 9:00 pm cannot have occurred prior to 5:55 pm by the first computing device's clock and it cannot have occurred after 6:05 pm by the first computing device's clock. The first boundary is true because the reference computing device cannot have responded to a request before the request was sent. Therefore, since the request was not sent until 5:55 pm by the first computing device's clock, the response of a reference time of 9:00 pm cannot have occurred prior to that. Similarly, the second boundary is true because the reference computing device must have responded to the request prior to that response being received by the first computing device. Therefore, since the response was received at 6:05 pm by the first computing device's clock, the reference time of 9:00 pm cannot have occurred later than that.

Using the above determined boundaries, the first computing device can determine that its clock is somewhere between three hours and five minutes slow and two hours and 55 minutes slow. Averaging those two boundaries results in a determination that the first computing device's clock is approximately three hours slow, with definite boundaries of five minutes on either side. The first computing device can therefore reset its clock three hours ahead and can maintain the knowledge that there is an upper and lower bound of five minutes in either direction. Thus, if the first computing device's lease expired at 9:00 pm, the first computing device could complete its modifications by 8:55 pm, by its clock, since given the five minute boundaries, 8:55 pm by its clock is the earliest that the reference time can be 9:00 pm.

Unfortunately, malicious computing devices or processes can interfere with the above assumptions and thereby render meaningless the determined bounds of the reference time. For example, a malicious computer could indicate that a reply to a later request is actually the reply to an earlier request, causing the determined bounds to be incorrect. To prevent interference by malicious devices or processes, the first computing device can cryptographically sign the request or the first computing device can generate a unique unpredictable value and include this value with the request. Such unique, unpredictable values are known in the art as nonces. If the reference computing device returns the cryptographically signed request or nonce, then the reply can be accurately associated with a particular request. The accurate association between a request and the reply to that request maintains the truism that a reply cannot be sent before the request is sent and, as described above, can be used to determine an accurate boundary.

Embodiments of the present invention will be described in further detail below. As a preliminary matter, a detailed description of a suitable computing device for implementing the present invention will be presented, followed by detailed descriptions of the mechanisms contemplated by embodiments of the present invention.

Turning to the drawings, wherein like reference numerals refer to like elements, the invention is illustrated as being implemented in a suitable computing environment. Although not required, the invention will be described in the general context of computer-executable instructions, such as program modules, being executed by a computing device. Generally, program modules include routines, programs, objects, components, data structures, etc. that perform particular tasks or implement particular abstract data types. Moreover, those skilled in the art will appreciate that the invention may be practiced with other computer system configurations, including personal computers, server computers, hand-held devices, multi-processor systems, microprocessor-based or programmable consumer electronics, network PCs, mini-computers, mainframe computers, and the like. The invention may be practiced in distributed computing environments where tasks are performed by remote processing devices that are linked through a communications network. In a distributed computing environment, program modules may be located in both local and remote memory storage devices.

Turning now to FIG. 1, a general purpose computing device 20 is shown, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computing device 20, such as during start-up, is stored in ROM 24. The computing device 20 further can include a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the computing device 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the computing device 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, computing devices typically include other peripheral output devices, not shown, such as speakers and printers.

The computing device 20 may operate in a networked environment using logical connections to one or more remote computers, such as a remote computing device 49. The remote computing device 49 may be another personal computer, a server, a router, a network PC, a peer device or other common network node, and typically includes many or all of the elements described above relative to the computing device 20. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computing device 20 is connected to the local network 51 through a network interface or adapter 53. When used in a WAN networking environment, the computing device 20 typically includes a modem 54 or other means for establishing communications over the WAN 52. The modem 54, which may be internal or external, is connected to the system bus 23 via the serial port interface 46. Program modules depicted relative to the computing device 20, or portions thereof, may be stored in the remote memory storage device if such is present. It will be appreciated that the network connections shown are exemplary and other means of establishing a communications link between the computers may be used.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation, by the processing unit of the computer, of electrical signals representing data in a structured form. This manipulation transforms the data or maintains it at locations in the memory system of the computing device, which reconfigures or otherwise alters the operation of the computing device in a manner well understood by those skilled in the art. The data structures where data is maintained are physical locations of the-memory that have particular properties defined by the format of the data. However, while the invention is being described in the foregoing context, it is not meant to be limiting as those of skill in the art will appreciate that various acts and operations described hereinafter may also be implemented in hardware.

Figure 2:
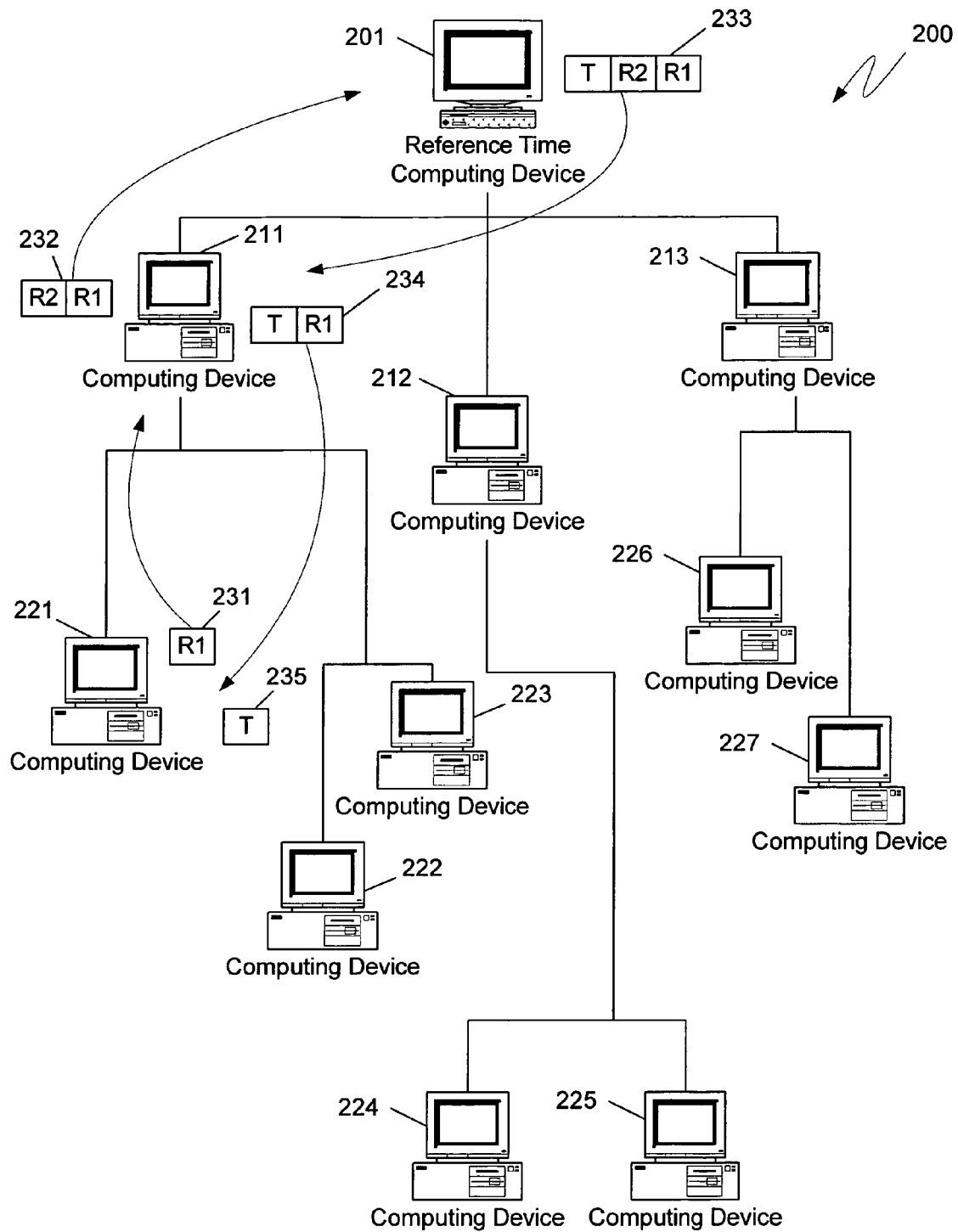
FIG. 2 is a network diagram generally illustrating the propagation of messages in an embodiment of the present invention.

Turning to FIG. 2, a distributed computing system 200 is shown arranged in a network tree diagram. As will be known by those of skill in the art, the layered arrangement of the computing devices shown in FIG. 2 is an abstraction, and does not necessarily illustrate the physical connections between the computing devices shown. Thus, while computing device 221 is shown to be further than computing device 211 from the reference time computing device 201, the physical arrangement of the distributed computing system 200 may, in fact, place computing device 221 in a closer physical location to the reference time computing device 201 than computing device 211. Nevertheless, for simplicity, the distributed computing system 200 is illustrated as having three layers: a first layer comprising the reference time computing device 201, a second layer comprising computing devices 211, 212, and 213, and a third layer comprising computing devices 221, 222, 223, 224, 225, 226, and 227.

As described above, a computing device can determine an upper and lower boundary for a reference time by sending a request to a reference time source, storing the time (according to the sending device's clock) when the request was sent, receiving a response containing the reference time from the reference time computing source, and storing the time (according to the receiving device's clock) when the response was received. The reference time source can be a single reference time computing device, as shown in FIG. 2, or two or more networked reference time computing devices acting as a single unit such as in the manner to be described further below. FIG. 2 illustrates a request packet 231 sent by computing device 221. As will be clear to those skilled in the art, the present description uses the term "packet" to describe any unit of data which can perform the functions enumerated, and does not intend to limit the term "packet" to mean only a "network packet" or similar quanta defined by network protocols. The computing device 221 can send the request packet 231 to a computing device on a higher level, such as devices 211, 212, or 213. In the illustrative example of FIG. 2, the request packet 231 is sent to computing device 211, which can also add its own request packet and create a new combination request packet 232. The computing device 211 can then send packet 232 to a computing device on a higher level. In the illustrative example of FIG. 2, the higher level contains the reference time computing device 201, which, because it is acting as the reference time source, can receive packet 232, encode the reference time, and create a new packet 233. The new packet 233 can comprise the reference time and the particular request packets to which the reference time computing device 201 is responding. Because one of the bounds of the reference time is determined by when the request packet was sent, the computing device requesting the reference time, such as computing devices 211 or 221, can either delay sending another request before receiving a response to a previous request, or a mechanism for linking requests to responses can be used. To avoid unnecessary delays, the latter option is preferable. Therefore, as shown in FIG. 2, the response packet 233 comprises the request packets to which it responds so that the receiving computing devices 211 and 221 can determine the bounds appropriately.

Once the reference time computing device 201 has created packet 233, it can return it to computing device 221. Computing device 211 can then determine the bounds of the reference time, and adjust its clock if necessary. Device 211 can also create a packet 234, comprising the reference time and the request packet from computing device 221, and can return packet 234 to device 221. Device 221 can then also determine the bounds of the reference time, and adjust its clock if necessary. For illustrative purposes, the receipt of the reference time by device 221 is shown as a packet 235, though no such packet needs to be created by device 221, since it can perform the remaining calculations internally.

To further illustrate how the operation of FIG. 2, described above, can determine the bounds of a reference time, an exemplary operation is described as follows. Device 221 can send packet 231 at a time of 7:55 pm by its own clock. Subsequently, device 211 can send packet 232 at a time of 8:28 pm by its own clock. Upon receipt of packet 232, the reference time computing device 201 can encode a reference time of 9:00 pm in packet 233, and can return packet 233 to device 211. Device 211 can receive packet 233 at 8:32 pm by its own clock. Upon extracting the reference time of 9:00 pm encoded in packet 233, the computing device 211 can determine the following bounds: the reference time of 9:00 pm cannot have occurred prior to 8:28 pm by the clock of device 211, since the device 211 had not yet even sent the request prior to that time, and the reference time of 9:00 pm cannot have occurred later than 8:32 pm by the clock of device 211, since by that time the device 211 had already received the packet 233. Consequently, the computing device 211 can determine that its clock is between 28 and 32 minutes slow. It can, therefore, set its clock ahead by 30 minutes, and can then store the boundary information that its clock is set to the reference time with an error of plus or minus two minutes. Alternatively, the computing device 211 can simply maintain a time pair representing the earliest possible time and the latest possible time. Thus, instead of setting its clock to 9:00 pm with an error of plus or minus two minutes, device 211 can maintain an earliest time clock currently set to 8:58 pm and a latest time clock currently set to 9:02 pm.

The operation of device 221 can occur in a manner similar to that of device 211, described above. Specifically, device 221 can receive packet 234 from device 211 at 8:05 pm by the clock of device 221. Upon extracting the reference time of 9:00 pm encoded in packet 234 the computing device 221 can determine the following bounds: the reference time of 9:00 pm cannot have occurred prior to 7:55 pm by the clock of device 221, since the device 221 had not yet even sent the request prior to that time, and the reference time of 9:00 pm cannot have occurred later than 8:05 pm by the clock of device 221, since by that time the device 221 had already received the packet 234. Consequently, the computing device 221 can determine that its clock is between 55 minutes and an hour and five minutes slow. It can, therefore, set its clock ahead by one hour, and can then store the boundary information that its clock is set to the reference time with an error of plus or minus five minutes. Again, as explained in detail above, the device can also maintain an earliest time and a latest time, which in the present example would be 8:55 pm and 9:05 pm. As can be seen, because device 221 is further down the illustrative network tree 200, the bounds of the reference time it determines may be greater than the bounds of the reference time determined by devices at higher levels of the network tree 200.

However, the above illustration assumes that the distributed computing environment does not contain any malicious devices or processes. For example, the above illustration assumes that device 211 does not inappropriately modify the packets that it receives. If, however, device 211 was malicious, it could modify the response packet 234 in such a manner that device 221 treats the packet 234 as a response to a request other than the request in packet 231. In such a case, the bounds determined by device 221 would be incorrect, as they would either be too large or too small. Alternatively, the malicious device 211 could simply not forwarding the packet at all, in which case device 211 would obtain no synchronization information. Both of these situations are undesirable, but the former is worse because it can lead to data corruption or inconsistency.

Figure 3A:
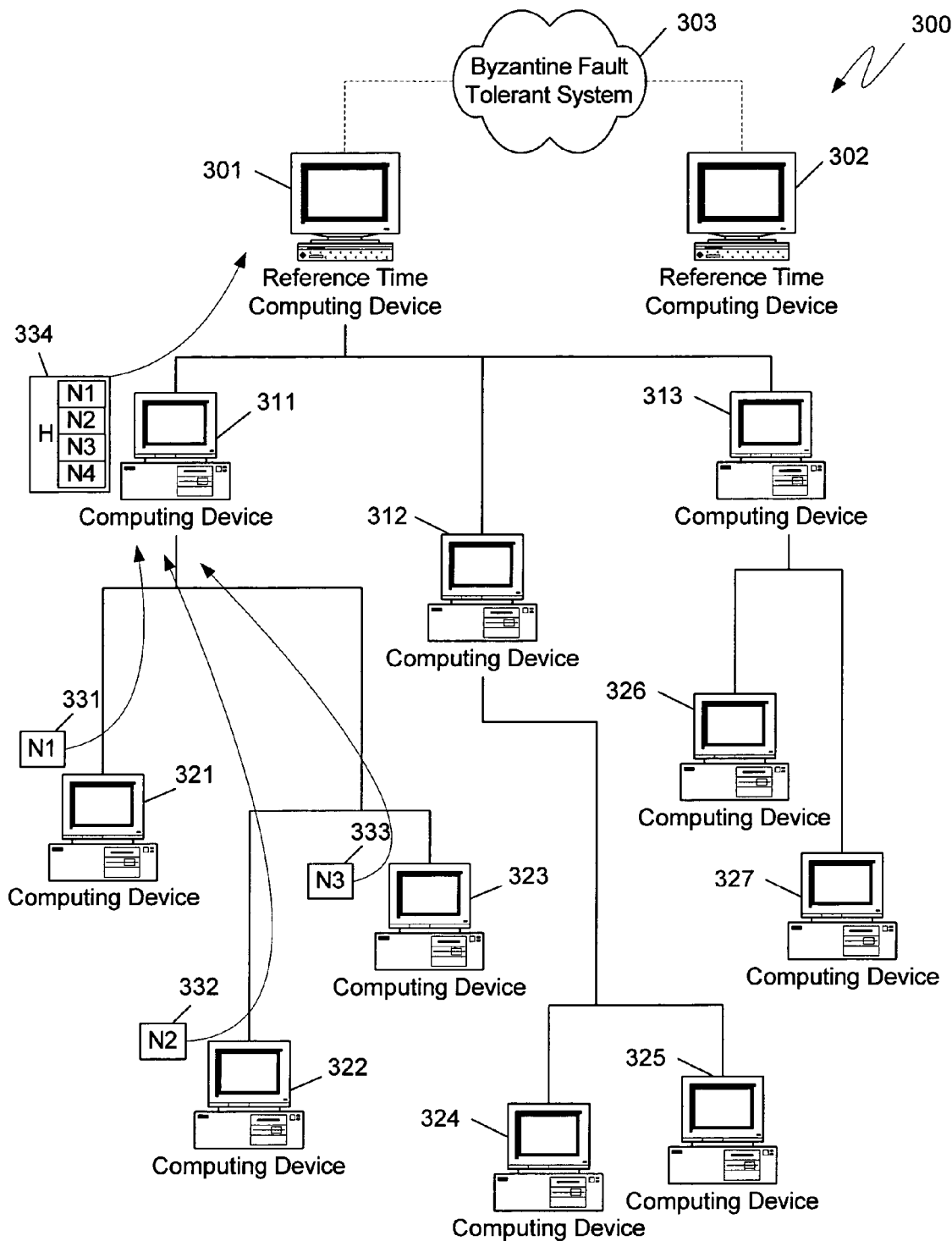
FIGS. 3a and 3b are network diagrams generally illustrating the propagation of cryptographically signed messages in an embodiment of the present invention.

To provide a fault tolerant mechanism for quantifying the synchronization of a device's clock to a reference time, one embodiment of the present invention contemplates the use of cryptographic algorithms to protect the data sent by the various devices. Turning to FIG. 3*a*, a distributed computing system in the form of a network tree diagram 300 is shown. The distributed computing system contains computing devices 311, 312, and 313 at one level, and devices 321, 322, 323, 324, 325, 326, and 327 at a lower level. The reference time computing device 301 is shown as a member of a Byzantine fault tolerant system 303, together with reference time computing device 302. In the illustrated distributed computing system, the Byzantine fault tolerant system 303, as a whole, acts as the reference time source, and none of the individual members of the system 303, such as reference time computing devices 301 or 302 can, by themselves, act as the reference time source. The operation of the Byzantine fault tolerant system 303 will be explained in detail below.

In an analogous fashion to the sending of packet 231 by device 221 as shown in FIG. 2, device 321 of FIG. 3 sends a packet 331 requesting a reference time from a reference time computing device such as devices 301 or 302. However, as shown in FIG. 3, to guard against malicious devices or processes, device 321 can cryptographically encrypt the request for a reference time in packet 331. Alternatively, device 321 can send a nonce, which, as is known by those skilled in the art, is a unit of data that is random and unique such that it cannot be forged by another process. The nonce can imply a request for a reference time and, when attached to the reply, can uniquely link the reply to the particular request that prompted the reply, even if intermediary devices are untrusted.

Each device in the network diagram 300 can use a similar system to protect against malicious devices. For example, when device 311 receives the nonce data in packet 331, it can add its own nonce and then cryptographically hash the two nonces into a packet, such as by using known hashing algorithms. Similarly, when the reference time computing device 301 receives the hashed nonces from device 311, it can, together with the other reference time computing devices that comprise the Byzantine fault tolerant system 303 that is the reference time source, add the reference time information and sign the combination of the reference time and the hashed nonces from device 311 and return that to device 311.

Thus far, the illustrations described have only traced the path of a request originating from a single computing device. However, a higher level computing device, such as device 311 may have multiple lower level computing devices connected to it, with each device seeking to synchronize its clock. One embodiment contemplated by the present invention is for the higher level devices to simply send along a request, in the manner described above with reference to FIG. 2, each time they receive a request from any lower level device. As will be evident to those skilled in the art, such a mechanism can quickly inundate higher level devices that may have hundreds of devices connected to them through multiple lower level layers. While sending a lot of messages may not noticeably impact the performance of the overall distributed computing system when using a simple mechanism, such as that illustrated in FIG. 2, the use of cryptographic signatures as shown in FIG. 3*a* can markedly increase the computing cost of creating and sending a message. Consequently, it may not be desirable for each higher level computing device to hash and send along messages each time they arrive from lower level computing devices.

An alternative approach contemplated by an embodiment of the present invention allows the higher level computing devices to collect some or all of the messages from lower level devices prior to hashing those messages and transmitting them onto to higher level devices. Returning to FIG. 3*a*, computing device 311 can wait to receive, not only the nonce 331 from computing device 321, but also the nonce 332 from computing device 322, and the nonce 333 from computing device 323. Once the computing device 311 has received each of these nonces, it can create its own nonce, and then hash this collection of four nonces together into a packet 334 for transmission to the higher level computing device 301. The illustrated packet 334 shown in FIG. 3*a* is marked with an "H" to indicate that its contents, in this case the nonces from devices 321, 322, 323, and 311, are hashed together.

By waiting until some or all of the requests from the lower level devices have received before transmitting a request to higher level devices, a computing device can greatly reduce the number of messages transmitted through the distributed computing system 300, and can reduce the computational expense of computing many cryptographic hashes. The reference time computing devices that comprise the Byzantine fault tolerant system 303 that is the reference time source, including devices 301 and 302, can similarly wait to receive requests from some or all of the devices in the lower levels before initiating the encoding of a reference time and the transmitting of responses in accordance with the particular Byzantine fault tolerant algorithm implemented by the system 303, which will be described in further detail below.

Figure 3B:
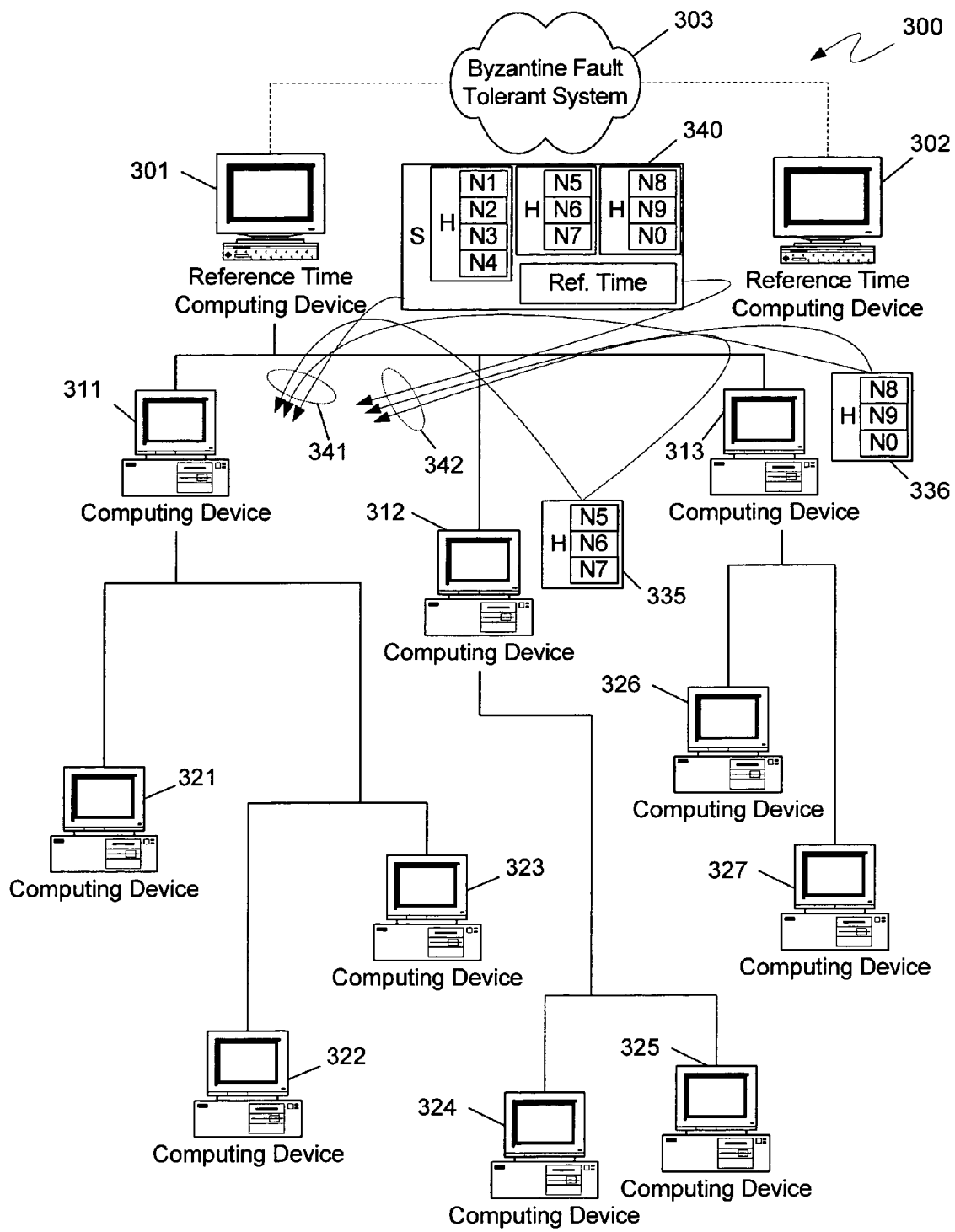

Turning to FIG. 3*b*, the distribution of the response of the reference time source is shown. As will be described in more detail below, FIG. 3*b* illustrates a response from a Byzantine fault tolerant system 303, which is the reference time source, and which comprises reference time computing devices 301 and 302. While a Byzantine fault tolerant system is one reference time source contemplated by one embodiment of the present invention for ensuring that a malicious device or process does not disseminate an incorrect reference time, other types of reference time sources are also contemplated by other embodiments of the present invention. For example, a reference time source can be a closely monitored computing device containing the de facto standard reference time. One example of such a device is the computing device operating the atomic clock in Boulder, Colorado, which is the reference used by many military and industrial applications in the United States. Alternatively, a reference time source can implement a known fault tolerant system for ensuring a correct reference time. Therefore, as can be seen, the mechanism used to ensure a correct, uncorrupted reference time is not essential to embodiments of the present invention.

For simplicity, an initial description of the operation of one cryptographic response mechanism according to an embodiment of the invention will be presented without reference to the Byzantine fault tolerant system 303 or any additional reference time computing devices, such as reference time computing device 302, shown in FIG. 3b. Thus, the initial description will assume that the reference time computing device 301, by itself, acts as the reference time source and that it is operating properly and is not malicious.

As described above, the reference time computing device 301 can wait until it has received requests from some or all of the lower level devices. Once device 301 has received, for example, a hashed collection 335 of nonces from devices 312, 324, and 325, and a hashed collection 336 of nonces from devices 313, 326 and 327, it can combine the hashed collections 334, 335, and 336 and a response reference time, and sign the combination. The packet 340, comprising the signed, hashed collections 334, 335, and 336 and the reference time, can then be returned to the lower level devices, such as device 311. In addition to packet 340, device 311 will also need to receive, from the reference time computing device 301, the hashed collections 335 and 336 that were combined with the time and then signed, since without that information device 311 may not be able to decode the reference time encoded in packet 340. The collection of information including packet 340 and hashed collections 335 and 336 is illustrated as being sent from device 301 to device 311 by the collection of arrows 341 show in FIG. 3b.

In a similar manner, device 311 can send receive the signed data in packet 340, the hashed collections 334, 335, and 336, and each of the constituent nonces that comprise the hashed collections 334, 335, and 336. As will be known to those skilled in the art, the cryptographic mechanism described above is an application of a Merkle tree. Additional information regarding Merkle trees can be found in the publication entitled "Protocols for Public Key Cryptosystems" by R. Merkle, given at the IEEE Symposium on Security and Privacy in 1980, the contents of which are herein incorporated by reference in their entirety into the present application.

The use of the cryptographic mechanisms described above enables the Byzantine fault tolerant determination of the bounds of a reference time. As will be explained in detail below, malicious devices or processes cannot successfully edit or tamper with the data being transmitted. The only malicious activity which a Byzantine device could perform is to delay or drop the data being transmitted. However, such a delay or a drop may only result in the bounds of the reference time increasing to positive and negative infinity, a delay or a drop cannot result in incorrect bounds. Furthermore, because devices can use multiple paths to determine the most accurate bounds, a path that yields unreasonably large bounds will be avoided, thereby mitigating the impact of malicious processes or devices.

The previous mechanisms described above with reference to FIG. 2 relied on the assumption that the request and the reference time had not been modified during transmission. Specifically, as described above, the determination of one boundary condition is based on the notion that a reply cannot be sent before a request for that reply is sent. Thus, one boundary can be set to be the time at which the request was sent. However, if the request was modified in transmission, there is no guarantee that the proper request is linked to the reply, thereby prohibiting the determination of one boundary. Through the use of the cryptographic mechanisms described above, the requesting device can link a reply to a request even in the presence of Byzantine failures within the distributed computing system, because the cryptographic mechanisms prevent malicious devices or processes from editing the request or the returned reference time. Thus, one boundary can be established as before, except that there is an element of Byzantine fault tolerance that may not have been present earlier.

The other boundary may not have been as affected by Byzantine faults since even a malicious device or process cannot reverse time. Thus the determination that the reference time cannot have occurred after the receipt of the reference time by the computing device, due to the causal nature of the universe, remains valid even in the presence of Byzantine failures.

Finally, the cryptographic mechanisms described do allow for a Byzantine fault tolerant determination of the reference time. Thus, all requesting devices will compute bounds on the reference clock that, in fact, include the correct reference time as determined by the reference time source.

However, as described above, the reference time source may itself be malicious, and may purposely provide incorrect reference time data. As also described above, various mechanisms can be implemented to ensure that the reference time source is not malicious, or to account for its maliciousness such that the reference time ultimately sent is, in fact, the correct reference time. One such mechanism contemplated by the present invention is the use of a Byzantine fault tolerant system to act as the reference time source and to determine the correct reference time to distribute to the requesting devices.

As shown in FIG. 3b, a Byzantine fault tolerant system 303 is comprised of reference time computing devices 301 and 302, and may be comprised of additional reference time computing devices that are not shown. As is known by those skilled in the art, Byzantine fault tolerant systems generally require 3f+1 devices, where f represents the maximum number of devices that can fail or become malicious. One known Byzantine fault tolerant system contemplated by an embodiment of the present invention is implemented through the use of the Byzantine Paxos algorithm, which is a modification to the known Paxos algorithm to account for Byzantine failures.

In the Byzantine Paxos algorithm, a leader device initiates a first phase by requesting that the remaining devices promise to vote for a given proposal that the leader intends to submit. Each device then sends its last vote information to all of the other devices. Once any device receives 2f+1 messages, each containing the same information, that device knows that the contained information was previously agreed upon, and it has a sufficient collection of messages to prove to another device that the information was previously agreed upon. Because there are at most f failed or malicious devices, any collection of at least f+1 equivalent messages is sufficient to show that the messages contain information that was previously agreed upon, since at least one non-failed, non-malicious device's message is in that group. A group of 2f+1 messages is sufficient to prove to another device that the messages contain information that was previously agreed upon, because even if the other device suspects that f malicious devices collaborated to collect the messages, at least f+1 messages remain that are not from malicious sources. Those remaining f+1 messages are then sufficient to prove to the other device that the messages contain information that was previously agreed upon, as just described.

With the 2f+1 messages collected, each device can send an indication of a safe proposal number, last vote information, and the 2f+1 messages as proof to the leader. Once the leader receives a quorum such messages, it can attempt to have the devices agree on a selection for a safe proposal value by starting the-a second phase. The leader will attach the quorum of received messages as a proof of the safety of the proposal to each of the devices. Each of the devices will signal their willingness to vote for the proposal to every other device. Once a device receives a quorum of messages from other devices indicating that they will accept the proposal, the device accepts the proposal and transmits its acceptance to the leader. If the leader receives a quorum of acceptances, then the leader knows that the proposal was selected. Additional information regarding the Byzantine Paxos algorithm can be found in co-pending application Ser. No. 10/184,773, filed on Jun. 28, 2002, and entitled "Byzantine Paxos", the disclosure of which is herein incorporated by reference, in its entirety, into the present application.

An alternative Byzantine fault tolerant system contemplated by an embodiment of the present invention can be implement by using the Fast Byzantine Paxos algorithm. The fast Byzantine Paxos algorithm operates in an analogous manner to the Byzantine Paxos algorithm for the first phase, described above. However, once the first phase has been completed, clients can send proposals directly to the devices. Each device will select a proposal if it carries the correct proposal number and a proof of safety and each device can transmit their response back to the client directly. Once the client receives 2f+1 responses, it knows that the proposal was selected by the Byzantine fault tolerant system. Additional information regarding the Fast Byzantine Paxos algorithm can be found in co-pending application Ser. No. 10/219,106, filed on Aug. 15, 2002, and entitled "Fast Byzantine Paxos", the disclosure of which is herein incorporated by reference, in its entirety, into the present application.

Yet another alternative Byzantine fault tolerant system contemplated by an embodiment of the present invention can be implemented by using a three phase algorithm instead of the two phase algorithms described above. Specifically, in a first phase, a leader sends a signed proposal to each of the other devices. Each of the other devices then enters a second phase if the proposal was signed properly and contains the proper sequence number. In the second phase, each of the other devices sends a message to every other device indicating that it has provisionally accepted the proposal. If a device receives an additional 2f messages (in addition to its own) indicating that those other devices have provisionally accepted the proposal, the device will accept the proposal and will transmit a commitment message to each of the other devices. Once each device receives 2f+1 commitment messages, it executes the operation and returns the results to the client. If the client receives f+1 equivalent results from f+1 devices, then it knows that the result is correct. Additional information regarding this Byzantine fault tolerant algorithm can be found in the paper entitled "Practical Byzantine Fault Tolerance" by Miguel Castro and Barbara Liskov, dated February 1999, published in the Proceedings of the Third Symposium on Operating Systems Design and Implementation", the disclosure of which is hereby incorporated by reference in its entirety into the present application.

A variant of the above described Byzantine fault tolerant system contemplated by an embodiment of the present invention can be implemented by using a three phase algorithm which proactively restarts each device participating in the algorithm. Additional information regarding this Byzantine fault tolerant algorithm can be found in the paper entitled "Proactive Recovery in a Byzantine-Fault-Tolerant System" by Miguel Castro and Barbara Liskov, dated Nov. 1, 1999, the disclosure of which is hereby incorporated by reference in its entirety into the present application.

Embodiments of the present invention contemplate the use of any of the above described Byzantine fault tolerant algorithms to provide a system which acts as a reference time source and which can agree upon a proper reference time even in the presence of malicious devices or processes. Returning to FIG. 3b, a Byzantine fault tolerant system 303, comprising reference time computing devices 301 and 302, and additional devices not shown, can be the reference time source. Using any of the above described algorithms, the Byzantine fault tolerant system 303 can agree on a set of hashed collections that can be used to create a response packet, such as packet 340. For example, device 301 can act as a leader in the system 303 and can propose that hashed collections 334, 335, and 336 be used in formulating the response packet 340. Each device of the system 303 can then, according to the particular Byzantine fault tolerant algorithm being used, as described above, decide whether the agree with device 301's proposal.

In addition to proposing which hashed collections can be used in formulating the response packet 340, a leader, such as device 301, or a client, can also propose a reference time to be included in the response packet 340. Each of the devices in the Byzantine fault tolerant system 303 can then determine whether to accept the proposal or not. One algorithm for determining whether to accept the proposal, which includes the proposed reference time, is to compare the proposed reference time to the clock of the particular voting device. If the proposed reference time is within a predetermined reliability range of the clock of the voting device, the voting device can accept the proposal. If a sufficient number of voting devices accept the proposal, in the manner described above with respect to the various Byzantine fault tolerant algorithms, then the accepted reference time can be used in the creation of packet 340. Similarly, if a sufficient number of voting devices reject the proposal, it can be an indication of a malicious or faulty leader, and the Byzantine fault tolerant system 303 can select a new leader in the manner of the Byzantine fault tolerant algorithms described above.

As will be recognized by those skilled in the art, a proposed reference time from a non-faulty, non-malicious leader, is more likely to be accepted if each of the devices in the Byzantine fault tolerant system 303 have their clocks closely synchronized. Various mechanisms for synchronizing clocks among the devices of a Byzantine fault tolerant system are contemplated by an embodiment of the present invention. One particularly useful mechanism is described in the paper entitled "Byzantine Clock Synchronization" by Leslie Lamport and P. M. Melliar-Smith, dated 1984, which has already been incorporated by reference into the present application.

As described above, many Byzantine fault tolerant algorithms send a collection of messages to the client, where a sufficiently large collection of identical messages is sufficient for the client to determine that the content of the messages is correct. Similarly, the Byzantine fault tolerant system 303 can send multiple messages to the computing devices at the next lower level. Therefore, as shown in FIG. 3b, computing device 311 can receive the packet 340, together with the hashed collections 335 and 336 from both reference time computing device 301, as message collection 341, and from reference time computing device 302, as message collection 342. Additionally, device 311 may receive analogous messages from the other devices comprising Byzantine fault tolerant system 303. If a sufficient number of these message collections are equivalent, then the computing device 311 can determine that they contain the correct information, even in the presence of malicious processes or devices. In one embodiment, if device 311 receives f+1 equivalent message collections, then it can trust the message collection, even in the face of at most f malicious devices.

As described above, a Byzantine fault tolerant system can provide safety in the reference clock provided at the top levels, and cryptographic algorithms can provide safety in the messages transmitted through the distributed computing system. However, malicious devices or processes can delay or drop messages and possibly disrupt the quantifying clock synchronization. To avoid such an impact by malicious devices or processes, the present invention contemplates using multiple paths to send requests to reference time computing devices.

Figure 4:
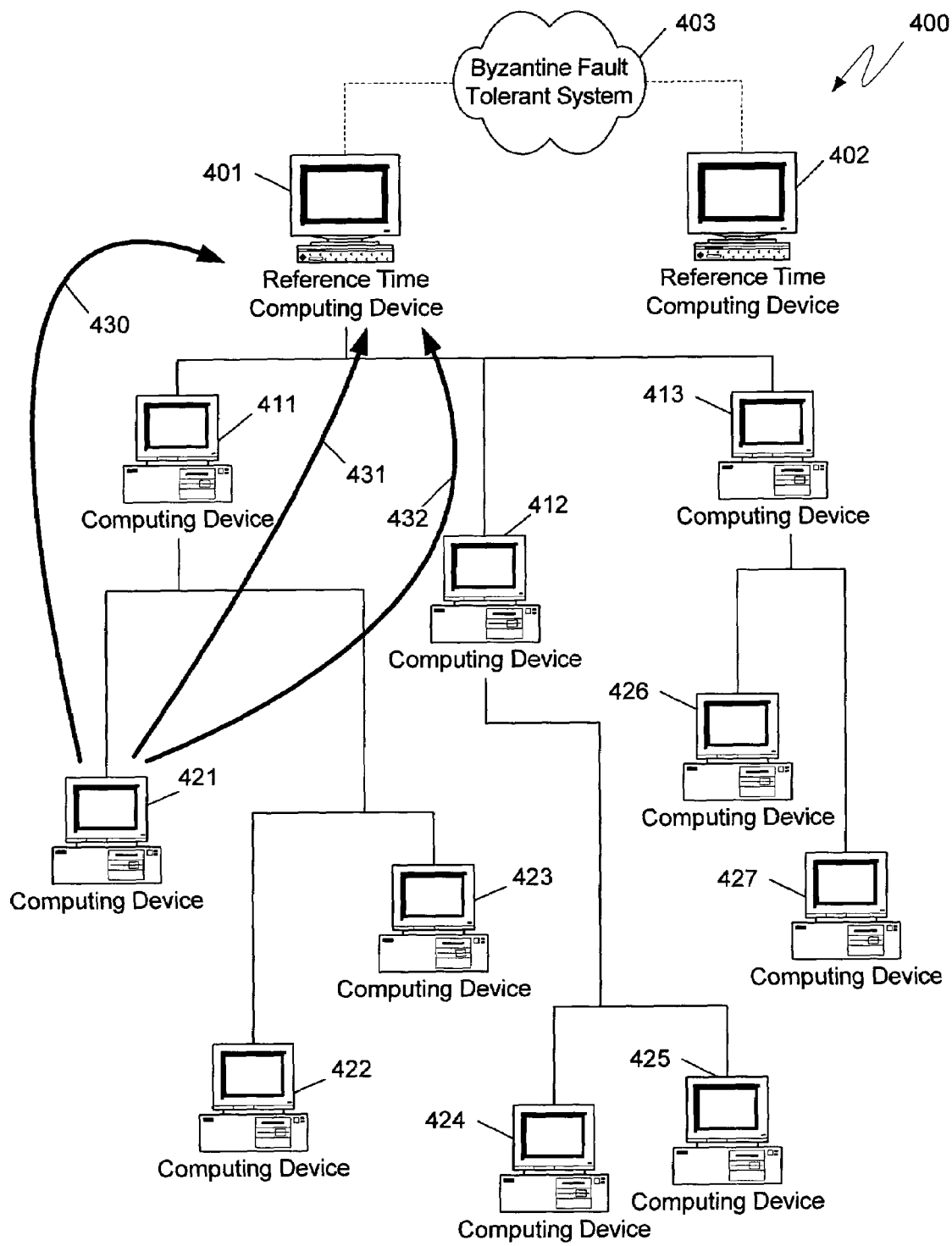
FIG. 4 is a network diagram generally illustrating the selection of multiple paths for the propagation of messages in an embodiment of the present invention.

Turning to FIG. 4, three exemplary paths 430, 431 and 432 are illustrated, providing computing device 421 three different pathways through the distributed computing system 400 with which to reach the reference time computing device 401. Path 431 passes through computing device 411 and would result in an operation very similar to that described above with reference to FIGS. 2, 3*a*, and 3*b*. Path 432 would result in similar operation except that computing device 412 would be substituted for device 411. One embodiment of the present invention contemplates that device 421 can simultaneously request a reference time through both path 431 and 432. In such a manner, if device 411 is malicious and delays or drops device 421's request, the request can still be delivered through path 432, resulting in a determination of bounds that are narrower than positive and negative infinity. Alternatively, even if device 411 is not malicious, it may simply be slower than device 412, or it may be on a different schedule, as will be described below, in which case path 432 will still result in a faster round trip, thereby resulting in narrower bounds.

An embodiment of the present invention also contemplates that as faster paths are discovered, slower paths can be discarded in favor of new paths. Therefore, returning to the above example, if device 411 is malicious or slow, then path 432 provides narrower bounds than path 431, and path 431 can be discarded in favor of a new path, such as path 430, for the subsequent request. As can be seen, however, path 430 is a direct path to the reference time computing device 401. Consequently, path 430 is likely to be faster than path 432, and after a subsequent request, path 432 may be discarded in favor of yet another new path. However, as will be evident to those skilled in the art, such a system of path optimization may result in every device in the distributed system 400 establishing a direct path to the reference time computing devices 401 and 402. One of the advantages of the present invention, namely that reference time computing devices are not inundated with requests will thereby be nullified. One solution contemplated by an embodiment of the present invention is to limit the paths available to a given device. Specifically, a device may be limited to paths that proceed only through devices at the same network tree level as the device, or at one level higher. Thus, in the exemplary network diagram shown in FIG. 4, device 421 could be allowed to use paths 431, 432, or any other path that passed through devices 411, 412, 413, 422, 423, 424, 425, 426, and 427. However, device 421 could not use path 430, since path 430 skips the current and next higher levels of the network tree and connects directly to the reference time computing device 401. In such a manner each device can retain the ability to seek optimal paths without sacrificing the efficiencies attendant in the operation of embodiments of the present invention.

The overall efficiency of the propagation of requests up the network tree can also be enhanced by scheduling the propagation of requests at each level of the tree. As was explained in detail above, at each intermediate level of the network tree, the computing device can wait to receive some or all of the nonces or hashed collection of nonces from the lower level computing devices before adding its own nonce and then hashing that group of messages. However, if one of the computing devices in the lower level fails, each of the devices' requests will be delayed as the higher level devices wait to receive a message from that device. Therefore, as can be seen, shorter delays in the propagation of requests up the network tree can be achieved if each device does not wait for all of the devices below it, but rather adds its nonce to whatever collection of nonces or hashes it already has, and then sends the requests to the next higher level. One mechanism contemplated by an embodiment of the present invention for achieving shorter delays, and therefore more accurate and narrower bounds, is for each device to implement its own schedule and send a message to the next higher level, in the manner described in detail above, whenever its schedule calls for it, regardless of the quantity of messages received from lower levels. However, because a lower level message that narrowly missed the schedule of a higher level computing device will have to wait until the next scheduled transmission of the higher level computing device, there can be an increase in efficiency by scheduling the transmission of messages on a more global scale, allowing each device to send its messages "on time" and potentially avoid having to wait for a full schedule cycle because the previous send of the higher level device was only narrowly missed.

Figure 5:
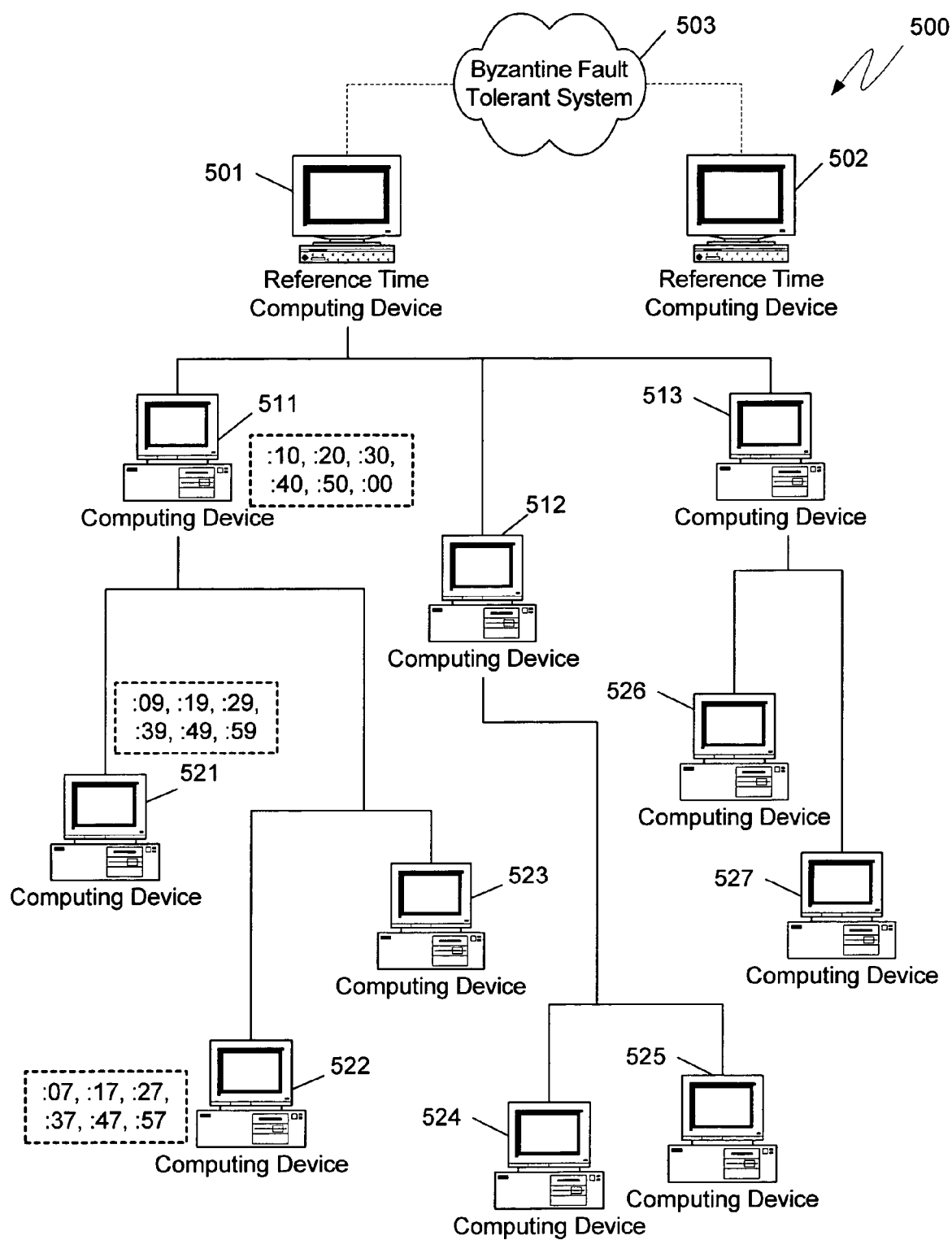
FIG. 5 a network diagram generally illustrating the scheduling of the propagation of messages in an embodiment of the present invention.

Turning to FIG. 5, a distributed computing environment 500 is illustrated with the schedules for devices 511, 521 and 522 shown in proximity to the devices themselves. For example, device 511 can schedule to send a message to the reference time computing device 501 every ten minutes on the ten minute marks as shown. Thus, the longest any nonce from computing devices 521 and 522 will have to wait is ten minutes, assuming it arrives immediately after the previous message was sent. However, device 511 can inform devices 521 and 522 of its schedule so that the devices 521 and 522 can coordinate their sending of nonces to eliminate as much of a wait at device 511 as possible. Thus, device 521 adopts an optimistic schedule, sending its nonce only 1 minute before the device 511 aggregates all of the nonces it has received, adds its own, hashes that collection, and transmits it to device 501. Conversely, device 522 has adopted a more conservative schedule, allowing 3 minutes for network delays, and clock errors. Over time, the schedule adopted by device 521 may result in more accurate, narrower bounds around the reference time, but device 521 will also more often determine excessively broad bounds than will device 522. However, by scheduling each device's transmissions, the risk of excessively broad bounds can be balanced with the need for narrow bounds on a device- or process-specific basis.

Another embodiment of the present invention contemplates scheduling the transmission of messages based on system-wide performance criteria. For example, the worst case scenario delay for either the synchronized or unsynchronized schedules can be determined as a product of the maximum number of levels in the network tree and the maximum length of time between successive sends in each device's schedule in a path up the levels of the tree. Consequently, overall system performance can be tuned by either varying the number of levels of the network tree, or by varying the duration between successive sends in each device's schedule.

While the above described mechanisms can determine a bound for the reference time, those bounds may only be valid for a given instant in time. As is known by those skilled in the art, most time-keeping instruments, including crystal oscillators used by many types of computing devices, do not equally measure quanta of time. Therefore, any clock, whether on a computing device or otherwise, is likely to measure time at a slightly different rate than any other clock. The change in the difference between the clock of an individual computing device and the reference time computing device is known as drift. Embodiments of the present invention contemplate accounting for the clock drift by comparing the first derivative, the second derivative, or higher derivatives of the local and reference clocks or accounting for the clock drift by linearly extrapolating historical rate information.

As is known by those skilled in the art, most computing devices derive time information from a crystal oscillator. Such crystal oscillators have a specific frequency that can be accurately measured. However, each crystal oscillator's frequency may be ever so slightly different from any other crystal oscillator's frequency. If the cause of the drift between the clock of a computing device and the reference time computing device is due primarily to this hardware difference, then the drift is likely to be constant. In such a case historical rate information can be very useful in compensating a determined reference time bound for drift. For example, historical rate information may reveal that a given computing device's oscillator varies from the reference time computing device's oscillator by 10 milliseconds for every minute of elapsed time. Consequently, the determined reference time bound can simply be increased by 10 milliseconds for every minute that has elapsed since the bound was determined.

Sometimes, however, the drift between the clock of a computing device and the clock of a reference time computing device is not due to predictable, measurable properties, such as the exact oscillator frequency. Often the cause of the drift may be due to environmental factors, such as heat or vibration. In such a case, the drift is not likely to be linear, but may be modeled only though higher order equations. In one embodiment of the present invention, first order, second order, or higher order equations can relate the drift as a function of the elapsed time or other variables. An alternative embodiment of the present invention avoids the complexities of accurately modeling what might be random processes, such as heat, and instead applies a boundary-based approach. Specifically, the predictable components of the drift, such as those described above, can be removed from the measurements, leaving only the more random components of the drift, providing a more accurate boundary for the non-predictable components of the drift. Thus, the exact drift may not be easily modeled, but it can be determined with reasonable accuracy, especially if the predictable components of the drift dominate. As before, the determined reference time bound can modified to account for this drift. While such a calculation may result in a broader range than would have been obtained with a more accurate model, the increase in the range may not affect many applications, while the simplicity of the calculation may avoid unnecessary algorithmic complexities.

Once the bound of the reference time is determined by a computing device in a distributed computing system, the computing device can use the bound in a manner consistent with the Byzantine fault tolerant nature of the algorithms used to determined the bound in the first place, as was described in detail above. In one embodiment of the present application, the computing devices that have determined the bounds in the manner described above can themselves be part of a Byzantine fault tolerant system. Such a Byzantine fault tolerant system can be implemented though the use of any of the known Byzantine fault tolerant algorithms, including those described in detail above.

Using any of the above described Byzantine fault tolerant algorithms, a computing device can propose to the Byzantine fault tolerant system, comprised of the devices of the distributed computing system, that a particular range of time be adopted for a given operation. Each device of the Byzantine fault tolerant system can then vote whether to agree with the bound. If a sufficient number of devices agree with the bound, the system can implement the operation with the selected bound.

One condition, contemplated by an embodiment of the present invention, for agreeing with a proposed bound can be to agree with the proposed bound if the individual bound, determined by the voting device in the manner described in detail above, is wholly within the proposed bound. For example, if a device proposes that the reference time is somewhere between 8:45 pm and 9:15 pm, and a voting device has determined the reference time to be between 8:50 pm and 9:10 pm, then the voting device can vote for the proposed bound. However, if the voting device has determined the reference time to be between 8:50 pm and 9:20 pm, then the voting device may choose to not vote for the proposed bound, since the voting device believes that the reference time may be as late as 9:20 pm, which is not taken into account in the proposed bound of 8:45 pm and 9:15 pm. As can be seen, implementing this condition can result in the Byzantine fault tolerant system agreeing only on very large bounds. Such bounds may provide safety, but they may be so large as to prevent the system from efficiently performing useful operations.

An alternative condition, contemplated by another embodiment of the present invention, for agreeing with a proposed bound, can be to agree with the proposed bound if the individual bound, determined by the voting device in the manner described in detail above, is within a predetermined variation of the proposed bound. For example, if a device proposes that the reference time is somewhere between 8:55 pm and 9:05 pm, and a voting device has determined the reference time to be between 8:53 pm and 9:08 pm, then the voting device can vote for the proposed bound if a predetermined variation of three minutes is selected. Because the bound as determined by the voting device is within three minutes, on either end, of the proposed bound, the voting device can accept the proposed bound. Similarly, a voting device that has determined the reference time to be between 8:57 pm and 9:03 pm can also vote for the proposed reference time bound of 8:55 pm and 9:05 pm because that second voting device's bounds are also within three minutes, on either end, of the proposed bound.

Another embodiment of the present invention can provide for the selection of a new leader to implement a Byzantine fault tolerant algorithm, in the Byzantine fault tolerant system comprised of the devices of the distributed computing system, if a sufficient number of devices do not vote for the proposed time bound proposed by the current leader. In such a manner faulty or malicious devices or processes can only minimally disrupt the operation of the system.

Returning to the earlier example in which two devices sought to edit a database; once the Byzantine fault tolerant system, comprised of the devices of the distributed computing system, has determined a bound for the reference time to use, each device can then use that bound to provide access to clients who wish to perform time-specific functions, such as editing the database. Therefore, one device of the Byzantine fault tolerant system may allow a client to edit a copy of the database until the earliest time at which that client's lease expires, according to the determined time bound. Similarly, another device of the Byzantine fault tolerant system may allow a second client to edit a copy of the database commencing at the latest time at which that client's lease could start according to the determined time bound.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for determining a bound around a reference time such that the reference time is determined to have occurred between a first bound limit and a second bound limit, the method comprising the steps of:
   transmitting a protected reference time request from a first computing device to a higher level computing device, wherein the higher level computing device is a level closer to a reference time source;
   storing a transmittal time, according to a clock of the first computing device, when the protected reference time request was transmitted to the higher level computing device;
   receiving a response from the higher level computing device at the first computing device, the response comprising a protected reference time source response, the reference time source response comprising the reference time, and a collection of protected reference time requests from each first level computing device that had transmitted the collection of protected reference time requests to the reference time source prior to the reference time;
   storing a receipt time, according to the clock of the first computing device, when the response from the higher level computing device was received at the first computing device;
   setting the first bound limit at the transmittal time when the protected reference time request was transmitted to the higher level computing device; and
   setting the second bound limit at the receipt time when the response from the higher level computing device was received.

2. The method of claim 1, wherein the reference time source is a distributed computing system implementing a Byzantine fault-tolerant consensus algorithm.

3. The method of claim 1, wherein the protected reference time request and the protected reference time source response are protected through the use of encryption.

4. The method of claim 1, wherein the protected reference time request and the protected reference time source response are protected through the use of a nonce.

5. The method of claim 1 further comprising the steps of:
   receiving a second protected reference time request from a lower level computing device,
   wherein the lower level computing device is a level further from the reference time source; and
   incorporating the second protected reference time request into the protected reference time request prior to transmitting the protected reference time request to the higher level computing device.

6. The method of claim 5, wherein transmitting the protected reference time request is postponed until a predetermined number of protected reference time requests are received from lower level computing devices.

7. The method of claim 5, wherein transmitting the protected reference time request occurred at pre-scheduled times, wherein at least one lower level computing device was informed of the pre-scheduled times if any lower level computing devices are present.

8. The method of claim 1, wherein transmitting the protected reference time request to the higher level computing device comprises transmitting the protected reference time request to at least two higher level computing devices; and wherein setting the second bound limit at the receipt time comprises setting the second bound limit at a first receipt time when a first response from the at least two higher level computing devices was received.

9. The method of claim 1 further comprising the steps of:
   determining a rate of change of a system time with respect to the reference time; and setting the first bound limit and the second bound limit to account for the determined rate of change.

10. A computer-readable storage medium having computer-executable instructions for determining a bound around a reference time such that the reference time is determined to have occurred between a first bound limit and a second bound limit, the computer-executable instructions performing steps comprising:
    transmitting a protected reference time request from a first computing device to a higher level computing device, wherein the higher level computing device is a level closer to a reference time source;
    storing a transmittal time, according to a clock of the first computing device, when the protected reference time request was transmitted to the higher level computing device;
    receiving a response from the higher level computing device at the first computing device, the response comprising a protected reference time source response, the reference time source response comprising the reference time, and a collection of protected reference time requests from each first level computing device that had transmitted the collection of protected reference time requests to the reference time source prior to the reference time;
    storing a receipt time, according to the clock of the first computing device, when the response from the higher level computing device was received at the first computing device;
    setting the first bound limit at the transmittal time when the protected reference time request was transmitted to the higher level computing device; and
    setting the second bound limit at the receipt time when the response from the higher level computing device was received.

11. The computer-readable storage medium of claim 10, wherein the reference time source is a distributed computing system implementing a Byzantine fault-tolerant consensus algorithm.

12. The computer-readable storage medium of claim 10, wherein the protected reference time request and the protected reference time source response are protected through the use of encryption.

13. The computer-readable storage medium of claim 10, wherein the protected reference time request and the protected reference time source response are protected through the use of a nonce.

14. The computer-readable storage medium of claim 10, wherein the response from the higher level computing device is structured in accordance with a Merkle tree algorithm.

15. The computer-readable storage medium of claim 10 having further computer-executable instructions performing steps comprising: receiving a second protected reference time request from a lower level computing device, wherein the lower level computing device is a level further from the reference time source; and incorporating the second protected reference time request into the protected reference time request prior to transmitting the protected reference time request to the higher level computing device.

16. The computer-readable storage medium of claim 15, wherein transmitting the protected reference time request is postponed until a predetermined number of protected reference time requests are received from lower level computing devices.

17. The computer-readable storage medium of claim 15, wherein transmitting the protected reference time request occurred at pre-scheduled times, wherein at least one lower level computing device was informed of the pre-scheduled times if any lower level computing devices are present.

18. The computer-readable storage medium of claim 10, wherein the computer-executable instructions performing transmitting the protected reference time request to the higher level computing device comprise computer-executable instructions for transmitting the protected reference time request to at least two higher level computing devices; and wherein the computer-executable instructions performing setting the second bound limit at the receipt time comprise computer-executable instructions for setting the second bound limit at a first receipt time when a first response from the at least two higher level computing devices was received.

19. The computer-readable storage medium of claim 10 having further computer-executable instructions performing steps comprising: determining a rate of change of a system time with respect to the reference time; and setting the first bound limit and the second bound limit to account for the determined rate of change.

* * * * *